March 1, 1932.  H. T. FAUS  1,847,936
MEASURING INSTRUMENT
Filed Feb. 4, 1931
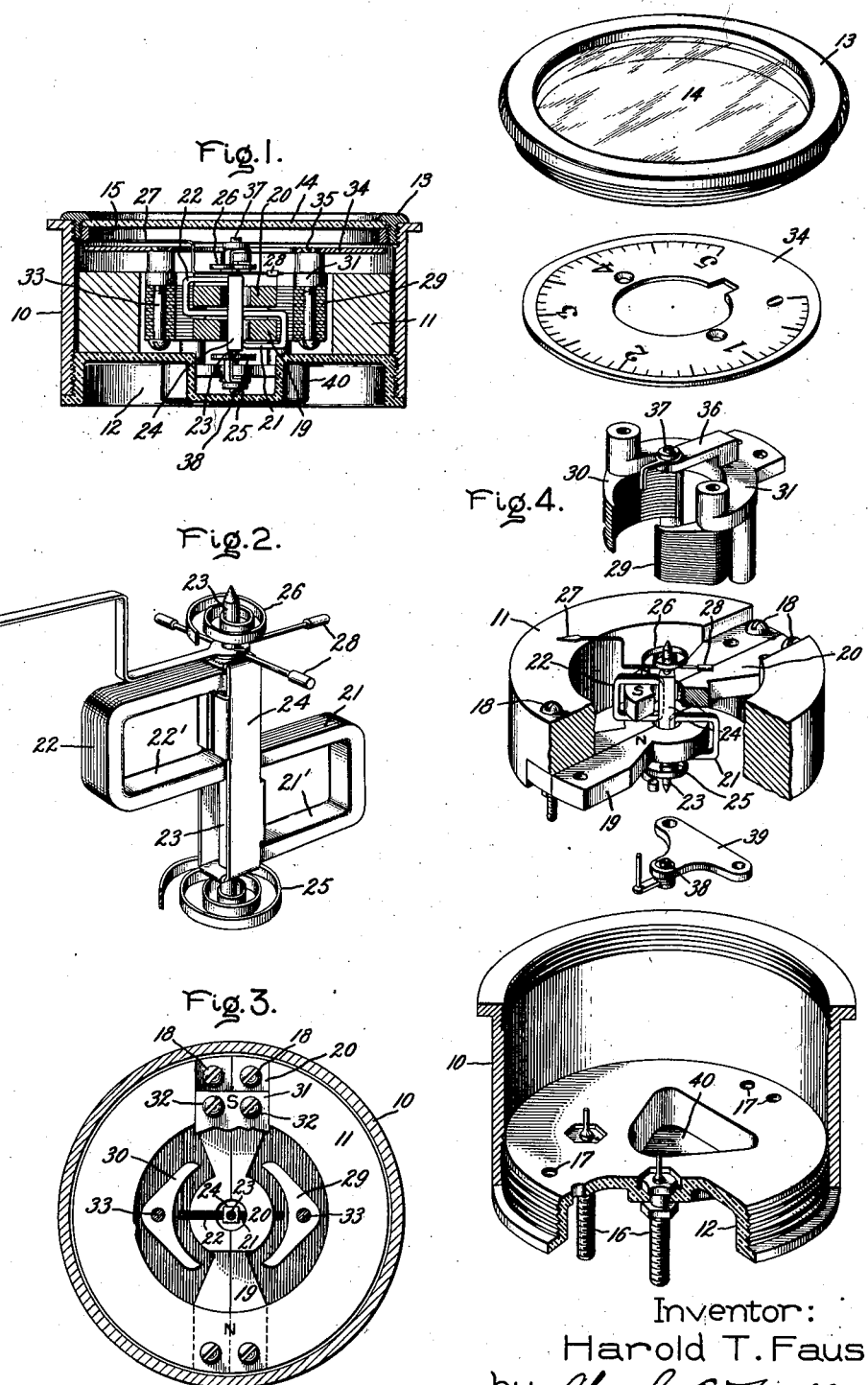
Inventor:
Harold T. Faus,
by Charles V. Tulla
His Attorney.

Patented Mar. 1, 1932

1,847,936

UNITED STATES PATENT OFFICE

HAROLD T. FAUS, OF LYNN, MASSACHUSETTS, ASSIGNOR TO GENERAL ELECTRIC COMPANY, A CORPORATION OF NEW YORK

MEASURING INSTRUMENT

Application filed February 4, 1931. Serial No. 513,376.

My invention relates to measuring instruments. Its object is to provide an instrument having the characteristics of high sensitivity, good damping, and a long scale built into an instrument of small, rugged construction. Such an instrument is desirable for use on aircraft where the space is limited, where the instrument is subject to more or less vibration but where good visibility is quite essential. The instrument of my invention was designed particularly for use as a part of an electric tachometer system for aeroplanes but is suitable for other uses.

The features of my invention which are believed to be novel and patentable will be pointed out in the claims appended hereto. For a better understanding of my invention reference is made in the following description to the accompanying drawings in which Fig. 1 is a cross sectional view through the instrument and casing on a plane parallel to the axis of rotation. Fig. 2 is a perspective view of the armature element. Fig. 3 is a top view of the magnetic system of the instrument with the scale, pointer and supporting structure removed. Fig. 4 is an exploded view of the essential parts of the instrument showing the casing at the bottom and the other parts above it in the order in which they are to be assembled in the casing.

It will be noted that the instrument of my invention has a double coil balanced armature encircling annularly shaped pole pieces in a manner somewhat similar to that shown in Fig. 5 of United States Patent No. 1,022,517, April 9, 1912, Thomson. My invention consists in an improvement of this form of instrument primarily with respect to reduction in size and an increase in sensitivity and these improvements are primarily due to the nature, shape and disposition of the permanent magnet and to auxiliary pole pieces separated from the main pole pieces for obtaining a more effective and uniform distribution of the flux with respect to the armature coils.

The casing 10 of the instrument is preferably made of a molded insulating material of cylindrical shape having an internal diameter only slightly larger than the external diameter of the annular shaped permanent magnet 11. The rear or base of the casing is closed by a part 12 threaded into the inner wall of the cylindrical portion. The entire internal mechanism of the instrument is supported on this base portion and is removable as a unit by unscrewing the base 12 from the cylindrical casing structure 10. The front of the casing is closed by a cover comprising a supporting rim 13 screwed into the cylindrical housing 10 and containing a transparent window 14 held in place by a threaded retaining ring 15. This casing is substantially dust and moisture tight and the base and cover may be interchanged to reverse the mounting as described in United States Patent No. 1,806,295, Kinnard, issued May 19, 1931, and assigned to the same assignee as the present invention. Instrument terminals 16 extend through the base for connecting the armature coils in series to an external electric circuit. Openings 17 are provided in the base for securing the instrument structure thereto and the bolts 18 for securing the main pole pieces 19, 20 to the annular shaped permanent magnet 11 serve also for securing the magnet which is of rectangular cross section directly against the base 12.

The permanent magnet is a solid annular casting of cobalt steel magnetized to have north and south poles on opposite diameters as indicated by the reference characters N and S in Fig. 3. I have discovered that the annular shape of magnet with inwardly projecting pole pieces on opposite diameters gives the highest known magnetic field for a given amount of material and size of magnet and that the use of a cobalt steel casting is far superior to the usual forged steel material for making small permanent magnets. Thus the permanent magnet gives a much higher flux density for its size and weight than permanent magnets used heretofore for similar applications and the use of such a magnet in a different form of instrument is described and claimed in my United States Patent No. 1,804,330, issued May 5, 1931, assigned to the same assignee as the present invention.

In my previous application I have described a structure in which the inwardly projecting pole pieces were cast integral with the permanent magnet. In the form of instrument described in the present application this is not feasible because of the difficulty of mounting the armature coils. The pole pieces 19 and 20 are therefore made separate and secured in radial notches machined in the two faces of the magnet on opposite diameters as best shown in Figs. 3 and 4, each pole piece being divided into two halves along a line across which there is zero magnetic potential. The dividing of the pole pieces into two halves permits easy assembly of the annular pole tips within the armature coils 21 and 22 and about the shaft 23.

The pole pieces are preferably made of cold rolled steel although this is not essential. When thus assembled the annular pole tips are concentric to the shaft 23 with their flat parallel surfaces confronting each other and separated by a relatively narrow uniform air gap of sufficient dimensions to permit the free rotation of the armature coils 21 and 22 therein. The armature coils are rectangular in shape and substantially conform to the rectangular cross section of the annular pole tips. The armature coils extend at right angles to the shaft, one embracing the upper annular pole tip and the other the lower annular pole tip. The lower portion of coil 22 is in alignment with the upper portion of coil 21 and the coils are secured to the shaft in these portions in any suitable manner as for example by the light framework 24 illustrated which is secured between the shaft 23 and to the coils. The coils 21 and 22 are wound on light aluminum frames 21' and 22' and are connected in series in such relation that both produce torque in the same rotational direction when a current flows therethrough, the armature field reacting against the intense field set up by the permanent magnet. Damping is effected by the movement of the aluminum frames through the permanent magnet field. Also secured to the armature shaft are the usual spiral spring lead-in conductors 25 and 26, the pointer 27 and the counterbalancing arms 28. The armature as thus assembled may swing through an arc of about 300 degrees giving a long scale range.

To further increase the sensitivity and damping of the instrument as well as to obtain a more desirable scale distribution than that obtainable with the instrument as thus far described, I make use of auxiliary pole pieces 29 and 30 for obtaining a more effective distribution of the permanent magnet flux with respect to the armature coils. These auxiliary pole pieces are positioned outside of the coils and extend axially adjacent to both main pole pieces and serve to convey a portion of the permanent magnetic flux in a radial direction from one main pole piece, then axially through the auxiliary pole pieces and then radially again to the other main pole piece. The position of these auxiliary pole pieces with respect to the main pole pieces and armature coils is shown in Figs. 1 and 3. The auxiliary pole pieces are supported by a non-magnetic holder 31 secured by bolts 32 (see Fig. 3) to the upper main pole piece 20 adjacent the annular magnet 11. These auxiliary pole pieces are thus spaced from all remaining portions of the permanent magnet circuit by magnetic air gaps so proportioned as to obtain the flux distribution desired. The outer ends of the armature coils 21 and 22 and the outer ends of the aluminum frames 21' and 22' move in the flux which passes in radial directions between the main and auxiliary pole pieces so that the sensitivity and damping is increased considerably. Fully half of the surface of each armature coil and supporting frame is now within a zone crossed by the permanent magnet flux. I have found that these auxiliary pole pieces increase the sensitivity of the instrument by about 40 per cent. They also improve the scale distribution and a substantially uniform scale distribution may easily be obtained by their use. Without their use the flux density in the effective armature air gap tends to be weaker for the armature position shown in Fig. 3 than for a position at right angles thereto. The addition of the auxiliary pole pieces increases the effective field over the arc adjacent such auxiliary pole pieces and as stated before not only gives a more uniform effective flux distribution but materially increases the effectiveness of the permanent magnet flux and the sensitivity of the instrument. The outer edges of these auxiliary pole pieces approach the annular shaped permanent magnet quite closely but at points removed from the north and south poles where the magnetic polarity of the annular magnet is neutral so that the presence of the auxiliary pole pieces in the positions shown does not produce any detrimental effect upon the strength of the permanent magnet. I have shown the auxiliary pole pieces as being laminated. This apparently has no beneficial or detrimental magnetic effect but is a manufacturing convenience. The auxiliary pole pieces are preferably made of soft iron.

The support 31 to which the auxiliary pole pieces are secured by set screws 33 also serves as the support for the scale plate 34, the latter being fastened thereto by screws 35 (see Fig. 1). The pointer and the scale indications are preferably painted with luminous paint. An arm 36 of the member 31 carries the upper bearing 37 and support for the spiral spring 26. The lower bearing 38 and support for spiral spring 25 is held by a member 39 secured in a depression 40 in the base of the casing.

The instrument as thus constructed has good damping, exceptionally high sensitivity, a long uniform scale, and is moreover small, rugged and compact. The parts are relatively few in number and are easily constructed and assembled. Instruments as thus constructed for use on aeroplanes are now built having an external diameter of the casing 10 of 2 13/16 inches and otherwise proportioned substantially as represented in the drawings.

I do not wish to limit my invention to any particular size of instrument or to the exact details of construction described but seek claims commensurate with the true spirit and scope of the invention disclosed.

What I claim as new and desire to secure by Letters Patent of the United States is:

1. A measuring instrument comprising a permanent magnet having annular pole tips spaced apart in parallel planes about a common axis whereby flux passes from one pole piece to the other in the axial direction of the annular pole tips, an armature having its axis of rotation on the axis of the annular pole tips and having a coil encircling one annular pole tip and another coil encircling the other annular pole tip whereby said coils are cut by said flux when the armature is rotated and auxiliary pole pieces extending in an axial direction adjacent to both main pole pieces outside of said coils whereby a portion of the magnetic flux between the main pole pieces is caused to cross the path of rotation of the armature coils in radial directions.

2. A measuring instrument comprising a permanent magnet of annular shape magnetized to have north and south poles on opposite diameter points, main pole pieces extending inwardly from said points and terminating in parallel annular pole tips concentric to the annular magnet, an armature pivoted for rotation on the axis of the annular magnet, a pair of coils on said armature one encircling one annular pole tip and the other encircling the other annular pole tip whereby said coils are influenced by flux passing between said pole pieces in an axial direction, and auxiliary pole pieces positioned to cause a portion of the permanent magnet flux between the main pole pieces to enter and leave the main pole pieces in radial directions through paths cut by said coils.

3. A measuring instrument comprising an annular permanent magnet magnetized to have north and south poles at opposite diameter points, main pole pieces extending inwardly from said points and having annular pole tips mounted parallel to each other and concentric with the annular permanent magnet, auxiliary pole pieces magnetically disconnected from the main pole pieces and permanent magnet surrounding opposite sides of the annular pole tips between the points where they are joined with the permanent magnet, and an armature mounted for rotation on the axis of the permanent magnet and having coils encircling the annular pole tips.

4. A measuring instrument comprising a permanent magnet comprising an annular casting of cobalt steel magnetized to have north and south poles at opposite diameter points, main pole pieces extending inwardly from said points, said pole pieces having annular pole tips parallel to each other and concentric with the annular casting, auxiliary pole pieces separated from the permanent magnet and main pole pieces by air gaps surrounding opposite sides of the main pole pieces between points where they are joined with the annular casting, and an armature mounted for rotation on the axis of the annular casting having a coil on one side of the axis of rotation encircling one annular pole tip and a second coil on the opposite side of the axis of rotation encircling the other annular pole tip.

In witness whereof I have hereunto set my hand.

HAROLD T. FAUS.